United States Patent
Kuroki et al.

[11] Patent Number: 6,113,197
[45] Date of Patent: Sep. 5, 2000

[54] WHEEL BRAKING SYSTEM

[75] Inventors: Junsuke Kuroki, Yokohama; Eiji Yagi, Kanagawa; Akira Kimura, Kanagawa; Ichiro Kaneda, Kanagawa, all of Japan

[73] Assignee: Unisia Jecs Corporation, Atsugi, Japan

[21] Appl. No.: 08/972,733

[22] Filed: Nov. 18, 1997

[30] Foreign Application Priority Data

| Nov. 18, 1996 | [JP] | Japan | ................................. 8-306741 |
| Jan. 20, 1997 | [JP] | Japan | ................................. 9-007743 |
| Jan. 22, 1997 | [JP] | Japan | ................................. 9-009827 |

[51] Int. Cl.$^7$ ............................. B60T 13/18; B60T 8/34; B60T 8/42

[52] U.S. Cl. ........................ 303/11; 303/115.2; 303/113.4

[58] Field of Search ............................. 303/10, 11, 115.2, 303/113.4, 116.1, 116.4

[56] References Cited

U.S. PATENT DOCUMENTS

| 3,761,141 | 9/1973 | Baurle et al. | ........................ 303/113.1 |
| 5,026,124 | 6/1991 | Resch | .................................. 303/122.01 |
| 5,080,447 | 1/1992 | Leppek et al. | ............................ 303/100 |
| 5,129,714 | 7/1992 | Latarnik | ................................. 303/113.2 |
| 5,288,142 | 2/1994 | Burgdorf | ............................... 303/113.2 |
| 5,487,593 | 1/1996 | Potts et al. | ................................ 303/11 |
| 5,492,394 | 2/1996 | Kusano et al. | ....................... 303/113.2 |
| 5,505,527 | 4/1996 | Gray, Jr. et al. | .......................... 303/3 |
| 5,882,089 | 3/1999 | Nakamura et al. | ...................... 303/10 |

FOREIGN PATENT DOCUMENTS

| 4-230462 | 8/1992 | Japan . |
| 5-147524 | 6/1993 | Japan . |

*Primary Examiner*—Robert J. Oberleitner
*Assistant Examiner*—Robert A. Siconolfi
*Attorney, Agent, or Firm*—Foley & Lardner

[57] ABSTRACT

A wheel braking system comprises a motor driven gear pump, a relief line connecting the pump discharge to the pump intake, a wheel brake unit connected to the pump discharge, and a flow restriction in the relief line. A control unit controls the motor for the pump in response to an output signal of a brake pedal sensor. The brake pedal sensor generates the output signal indicative of the brake pedal stamping force. The control unit determines a desired motor speed for the sensed brake pedal stamping force and operates the motor.

11 Claims, 18 Drawing Sheets

WHEEL BRAKING SYSTEM

BACKGROUND OF THE INVENTION

1. Field of the Invention

The present invention relates to a wheel braking system for an automotive vehicle, and more particularly to a wheel braking system, which is easy to tune to meet various demands.

2. Description of the Related Art

U.S. Pat. No. 5,080,447, which corresponds to JP-A 4-230462, discloses a wheel brake unit operated by hydraulic pressure provided by a master cylinder and a hydraulic boost unit operated by the vehicle operator. The hydraulic fluid under pressure from the master cylinder is provided to the brake unit via brake lines and a pressure generator. An electronic controller controls the pressure generator to limit the brake pressure applied to the brake unit to prevent wheel lockup. When the controller senses a braking condition whereat the wheel is approaching an incipient wheel lock, the pressure generator is controlled to regulate the braking pressure to the wheel to maintain the braking of the wheel in a stable braking region.

The pressure generator includes a DC torque motor whose output shaft drives a gear train that, in turn, rotates a linear ball screw actuator. The ball screw actuator contains a linearly stationary ball screw that, when rotated, linearly positions a nut. The nut terminates in a position such that as the linear ball screw rotates, the piston is either extended or retracted depending upon the direction of rotation of the torque motor. The generator includes a housing in which a cylinder is formed. The piston is reciprocally received within the cylinder. The cylinder forms a portion of the fluid path between the master cylinder and the wheel brake unit. Included within this fluid path is a normally closed ball check valve, which, when closed, isolates the master cylinder from the wheel brake unit. The ball check valve is operated to an open position by the piston when it is positioned in an extended position within the cylinder. This position is the home position during normal vehicle braking. When the ball check valve is opened, fluid communication is provided between the master cylinder and the wheel brake unit. This position is the normal inactive position of the pressure generator so that the vehicle operator provides normal braking of the wheel of the vehicle upon actuation of the brakes. However, when the controller operates the torque motor to modulate the braking pressure in the wheel brake unit, the piston is retracted. This allows the ball check valve to seat and isolate the master cylinder from the wheel brake unit as long as the pressure in the cylinder is less than the pressure from the master cylinder. Further retraction of the piston functions to increase the volume in the cylinder, thereby decreasing the pressure applied to the wheel brake unit. By controlling the DC torque motor, pressure at the wheel brake can be modulated to controlled values less than the master cylinder pressure output. This exists until such time that the piston again unseats the ball check valve or until the pressure generated by the pressure generator at the wheel brake unit exceeds the fluid pressure output of the master cylinder. When this latter condition exists, the ball check valve is opened by the differential fluid pressure, which limits the pressure of the wheel brake unit at the master cylinder.

The known braking system employs the hydraulic boost unit for operation during vehicle normal braking and the pressure generator for operation during anti-lock braking. As mentioned before, the pressure generator includes the DC torque motor, gear train, linear ball screw actuator, and ball check valve. It would be desirable to reduce the number of component parts for reduced manufacturing cost. As rotation of the DC torque motor is converted into reciprocal motion of the piston via the gear train and linear ball screw actuator, the controller employs sophisticated and complicated control logic. This also pushes up manufacturing cost. Thus, it would be desirable to seek simplicity in the control logic employed by the controller. In this known system, the wheel cylinder pressure can never exceed the operator-established pressure. Thus, the hydraulic boost unit is needed in the known braking system according U.S. Pat. No. 5,080,447 to assist vehicle operator brake pedal effort.

JP-A 5-147524 discloses a hydraulic braking system in which the hydraulic fluid under pressure from a master cylinder is provided to a wheel brake unit via a gear pump that is driven by a DC motor. An electronic controller controls the gear pump to regulate supply of hydraulic fluid under pressure to and discharge thereof from the wheel brake unit to prevent wheel lookup. When the controller senses a braking condition whereat the wheel is approaching an incipient wheel lock, the DC motor is activated to turn the pump in a direction to discharge hydraulic fluid from the wheel brake unit. Subsequently, when the wheel is escaping from the incipient wheel lock, the controller reduces current passing through the DC motor, allowing the DC motor to turn in the opposite direction to increase the braking pressure applied to the wheel brake unit. When the controller supplies no current to the DC motor, the hydraulic fluid under pressure from the master cylinder pushes the gears of the pump open to reach the wheel brake unit. Thus, fluid path is provided between the master cylinder and the wheel brake unit when the vehicle operator operates the master cylinder.

According to this known braking system, the wheel brake pressure is determined as a function of the pump speed and the vehicle operator brake effort such that, with the same brake effort, only one wheel brake pressure value is established for one pump speed value. It is desirable for tuning the braking system to meet different demands that different wheel brake pressure values be established for one pump speed value, if need arises.

The present invention aims at providing a solution to this problem in the hydraulic braking system of this kind.

SUMMARY OF THE INVENTION

According to one aspect of the present invention, a hydraulic braking system includes a pump and a relief line for the pump wherein the relief line is flow restricted. The restriction may be chosen out of restrictions with different flow cross sectional areas. Alternatively, the restriction may take the form of a variable flow restriction.

According to another aspect of the present invention there is provided a wheel braking system for a vehicle, comprising:
 a source of hydraulic fluid;
 a pump having a pump intake connected to said source of hydraulic fluid and a pump discharge;
 a wheel brake unit connected to said pump at said pump discharge;
 a relief line for said pump; and
 a flow restriction provided for restricting flow of hydraulic fluid through said relief line.

DESCRIPTION OF THE EMBODIMENTS

Figure 1:
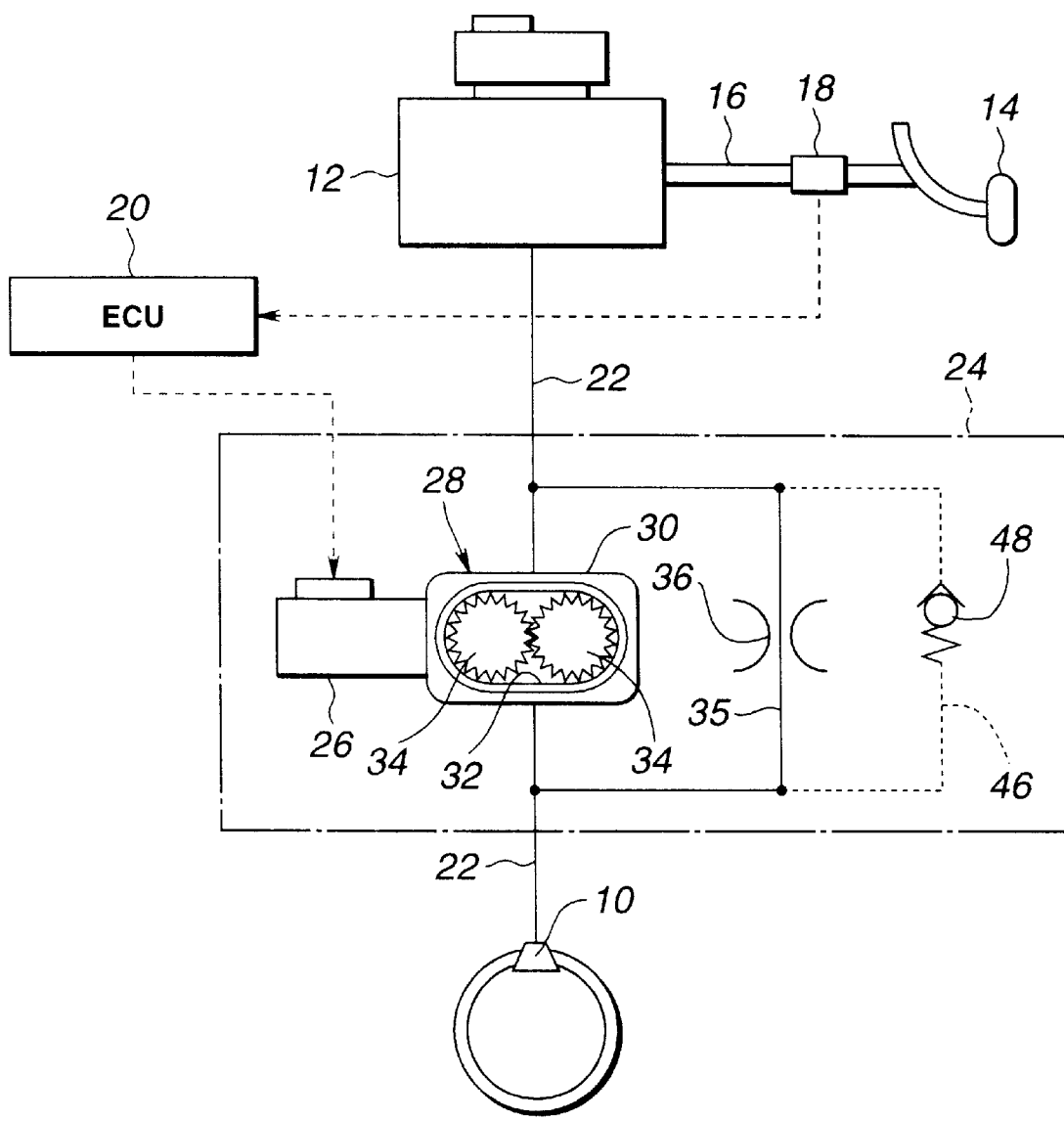
FIG. 1 is a diagram of a first embodiment of a wheel braking system including a motor driven pump and a restriction for controlling the wheel brake pressure.

A wheel braking system for a wheel of a motor vehicle is illustrated in FIG. 1. In general, the wheel includes a brake unit 10 operated by a hydraulic pressure provided by a master cylinder 12 operated by the vehicle operator. The master cylinder 12 is operated when the vehicle operator stamps a brake pedal 14. The operator demand for brake is proportional to force with which the vehicle operator stamps the brake pedal 14. Thus, this force may be hereinafter called "brake pedal stamping force." Brake pedal stamping force is transmitted mechanically via a rod 16 to the master cylinder 12 to operate it. A brake sensor 18 measures the brake pedal stamping force and provides an output signal indicative of the measured brake pedal stamping force. The output signal of the brake sensor 18 is fed to an electronic control unit 20.

The master cylinder 12 is connected to the wheel brake unit 10 via brake lines 22 and a pressure generator 24, which the electronic control unit 20 controls. The pressure generator 24 includes a DC torque motor 26 whose output shaft drives a pump 28. The pump 28 includes a pump housing 30 in which a pump chamber 32 is formed. In this embodiment, a gear pump is used so that the pump elements in the form of gears 34 are operatively disposed in the pump chamber 32. The pump 28 may take the form a vane pump or an axial piston pump. The pump chamber 32 forms a portion of the fluid path between the master cylinder 12 and the wheel brake unit 10.

The pressure generator 24 includes a relief line 35 with a flow restriction 36. The relief line 35 connects the pump discharge to the pump intake. When the pump 28 is at rest, the relief line 35 forms an additional portion of the fluid path between the master cylinder 12 and the wheel brake unit 10.

The control unit 20 generally takes the form of a digital computer based control unit. The control unit 20 includes a microprocessor that is standard in form and includes the standard elements such as a central processing unit, an analog-to-digital converter, a random access memory and input/output circuitry utilized to provide motor control signals to a motor driver interface circuit. The input/output circuit further includes an input port for receiving the brake pedal stamping force signal from the output of the analog-to-digital converter having in turn an input from the brake sensor. The central processing unit executes an operating program permanently stored in a read-only memory.

Figure 2:
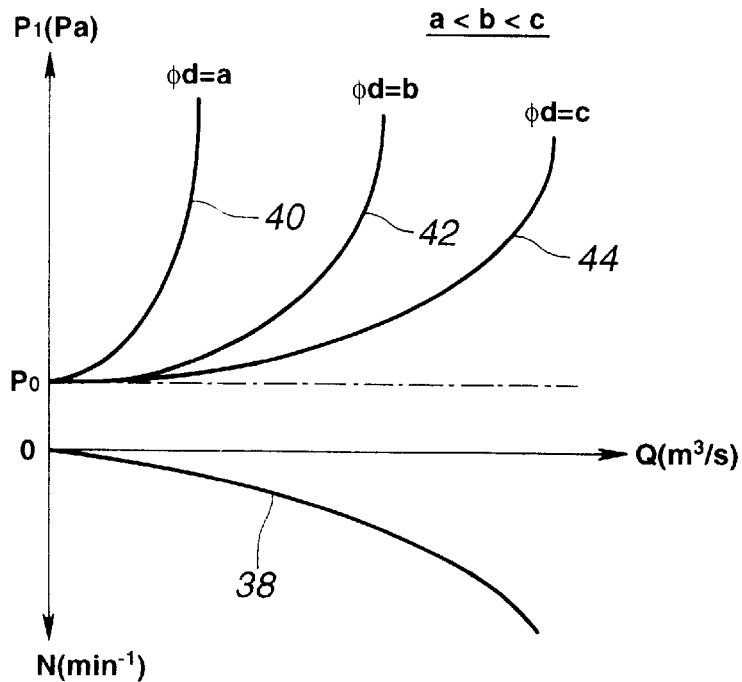
FIG. 2 shows changing relation between the wheel brake pressure $P_1$ and the pump discharge flow rate Q (m³/s) with different restriction bore inner diameters a, b and c (a <b <) and the relation between the pump speed N (min⁻¹) and the flow rate Q.
Figure 3:
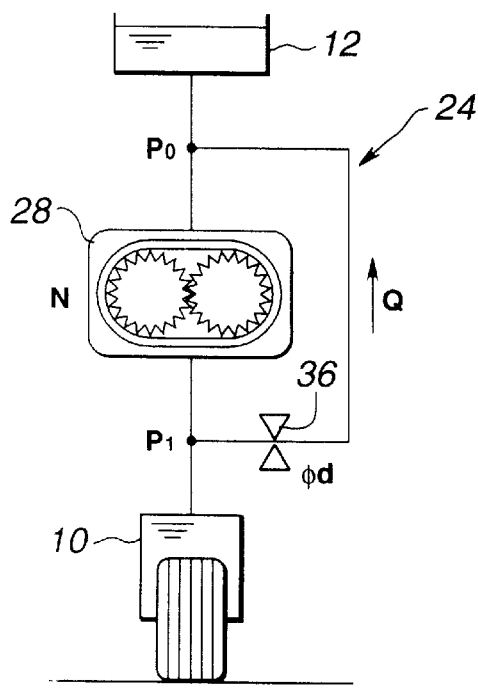
FIG. 3 is a diagram of a model illustrating the arrangement of the motor driven pump and the restriction and the brake unit.
Figure 4:
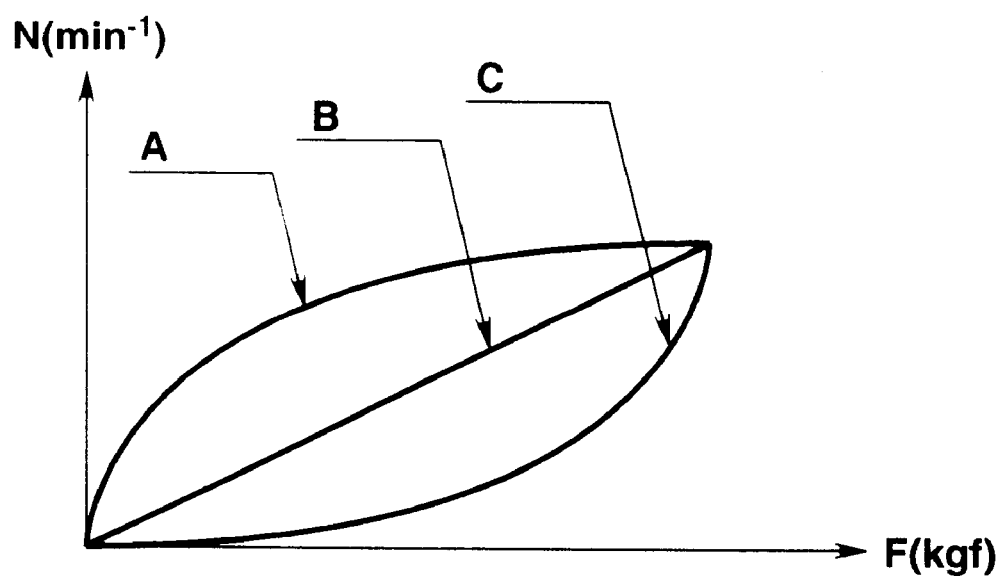
FIG. 4 show, as examples, three different relations between desired pump speed (N) and brake pedal effort (F)

A typical brake control established by the system of FIG. 1 is explained. When the vehicle operator stamps the brake pedal 14, the master cylinder 12 develops master cylinder pressure $P_0$ and the control unit 20 determines brake pedal stamping force F from the output of the brake sensor 18. When the brake pedal stamping force F is sensed, the control unit 20 determines a desired motor speed N predetermined for the sensed brake pedal stamping force F and determines motor current to keep the motor 26 to rotate at the desired speed N. This causes the pump 28 to discharge hydraulic fluid at a flow rate Q corresponding to the speed N at which the motor 26 rotates. FIG. 3 is a model of the system shown in FIG. 1. Referring to FIG. 3, hydraulic fluid discharged at flow rate Q by the pump 28 passes through the restriction 36 in a direction as indicated by an arrow. Assuming that the restriction 36 takes the form of a bore with an inner diameter Ød, wheel brake pressure $P_1$ is determined as a function of Q and Ød. In FIG. 2, a curve 38 illustrates how the flow rate Q of the pump 28 varies with varying pump speed N, and curves 40, 42 and 44 visualize the function. These curves 40, 42 and 44 illustrate changing relation between the wheel brake pressure $P_1$ and the flow rate Q with three different representative restriction bore inner diameters a, b and c (a<b<c). As readily seen from FIG. 2, with the same bore inner diameter Ød, the wheel brake pressure $P_1$ is determined by the motor speed N. Thus, with the same amount of brake pedal stamping force F, one may alter a level of wheel brake pressure $P_1$ by changing relation between the motor speed N and the brake pedal stamping force F. Curves A, B and C in FIG. 4 illustrate three different examples of the N-F relation.

When the vehicle operator holds the brake pedal 14 with the same brake pedal stamping force, the motor 26 keeps on rotating at a speed that is established upon initiation of brake pedal holding operation by the vehicle operator. Thus, the wheel brake pressure $P_1$ that is established upon the initiation of the brake pedal holding operation is maintained.

When, subsequently, the vehicle operator weakens the brake pedal stamping force, the motor speed drops in response to a drop of the brake pedal stamping force thereby to cause the wheel brake pressure to drop.

The control unit 20 calculates brake pedal release rate or speed V at which the brake pedal stamping force F drops and compares the release rate V with a predetermined reference Va. When the release rate V becomes greater than the reference Va upon rapid release of the brake pedal 14, the control unit 20 initiates reverse rotation of the motor 26 thereby to accomplish a quick drop of wheel brake pressure $P_1$.

Preferably, the pressure generator 24 may include a bypass line 46 across the pump 28. The bypass line 46 is provided with an one-way check valve 48 for providing one-way fluid delivery path from the master cylinder 12 to the wheel brake unit 10 as a fail-safe when the motor 26 or pump 28 should fail to operate.

As is readily seen from the curves in FIG. 2, it is very easy to modify the pattern of variation of wheel brake pressure against varying brake pedal stamping force only by replacing the restriction with a new one having different bore inner diameter. Thus, it is very convenient to tune or adjust the braking system to meet different demands with different vehicle characteristics so as to provide any desired so-called brake pedal feeling.

It is understood as an advantage that the wheel brake system does not require a brake boost unit.

Figure 5:
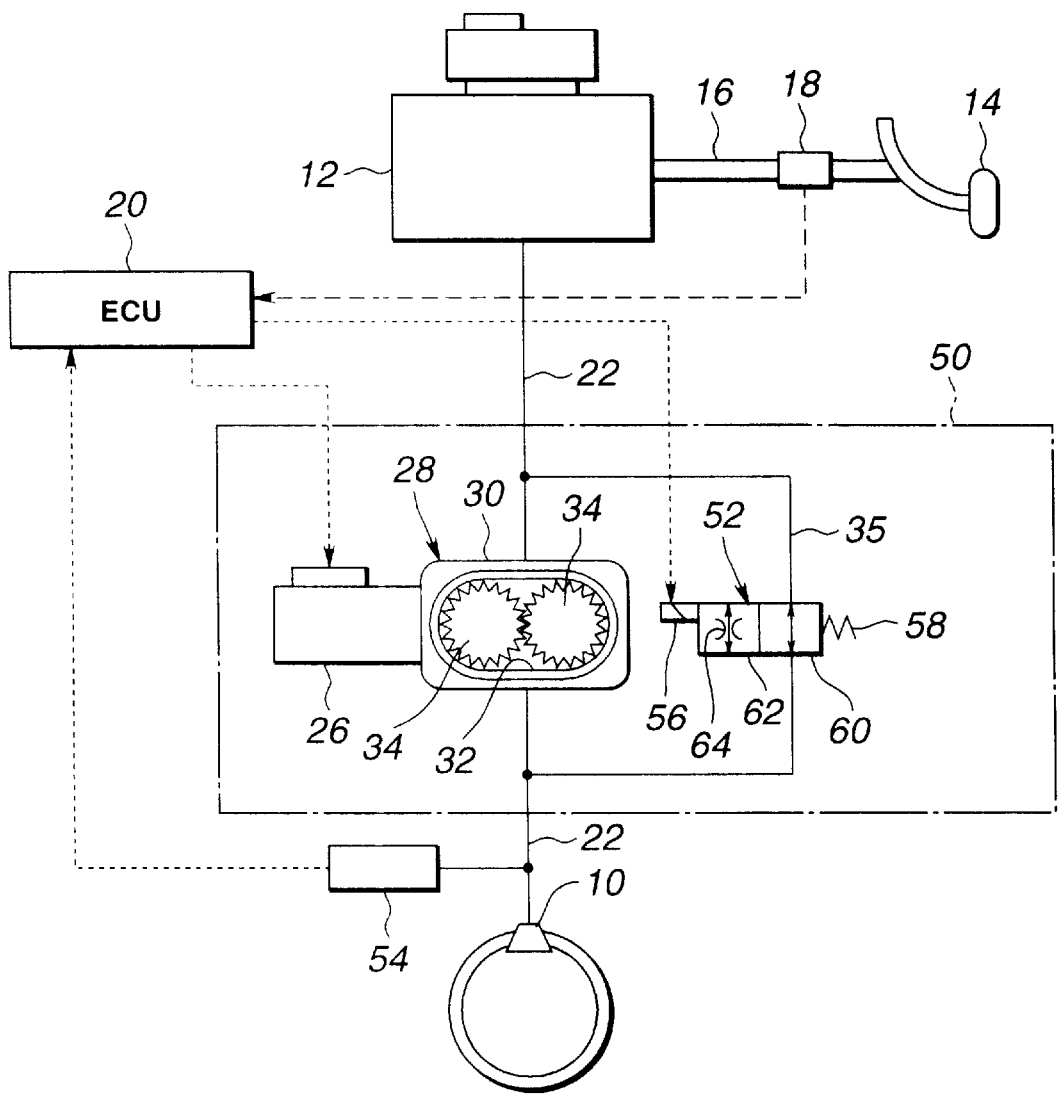
FIG. 5 is a diagram of a second embodiment of a wheel braking system including a solenoid operated two position switch valve in a relief line connected across a motor driven pump.

FIG. 5 shows a second embodiment. This second embodiment is substantially the same as the first embodiment that has been described in connection with FIGS. 1 through 4. However, in the second embodiment, an improved pressure generator 50 is used instead of the pressure generator 24. Another difference resides in the provision of a pressure sensor 54 to sense wheel brake pressure $P_1$.

The pressure generator 50 is improved in that a relief line 35 serves as a bypass line when a pump 28 should fail to operate. For this end, a solenoid operated two-position valve 52 is provided in the relief line 35. The solenoid operated two-position valve 52 has a solenoid 56 and a return spring 58. The valve 52 has a first position 60 and a second position 62. The first position 60 provides a free unrestricted bi-directional fluid path across the pump 28. The second position 62 provides a flow restriction 64. When the solenoid 56 is energized, the valve 52 takes the second position 62. When the solenoid 56 is not energized, the valve 52 takes the first position 60 owing to the action of the return spring 58. An electronic control unit 20 controls the solenoid 56.

A brake pedal sensor 18 generates a signal indicative of brake pedal stamping force F. The pressure sensor 54 senses wheel brake pressure $P_1$ and generates a signal indicative of the sensed wheel brake pressure $P_1$. The brake pedal stamping force indicative signal and the wheel brake pressure indicative signal are provided to the electronic control unit 20.

According to the second embodiment, the control unit 20 always inputs information regarding the brake pedal stamping force F and the wheel brake pressure $P_1$ in determining a desired motor speed N. This manner of determining the desired motor speed N provides high quality control.

Besides, as the solenoid operated valve 52 takes the first position when the brake pedal stamping force F is zero, the motor 26 is allowed to operate without pressure build-up in the wheel brake unit 10. If quick release of brake is needed, the solenoid-operated valve 52 takes the first position to provide unrestricted fluid path for return flow of hydraulic fluid from the wheel brake unit 10. Thus, reverse rotation of the pump 28 is not needed. In other words, reverse rotation of the pump 28 is not needed over the whole range of operation.

It is appreciated as an advantage of the second embodiment that the motor 26 is allowed to turn always in a forward direction over the whole range of operation owing to the provision of the solenoid operated valve 52. With the solenoid operated valve 52 in the first position, pressure buildup in the wheel brake unit 10 will not occur until the vehicle operator stamps the brake pedal 14 even if the pump 28 continues to operate to discharge hydraulic fluid. All of the hydraulic fluid discharged by the pump 28 returns to the pump intake via the relief line 35 that is unrestricted. Thus, it is possible to operate the pump 28 at high speeds. Gain can be altered to a desired level by varying range of speeds at which the pump 28 operates.

If initial response is to be improved, the solenoid-operated valve 52 should remain in the first position 60 for a predetermined period of time after a moment when the vehicle operator stamps the brake pedal 14. This allows unrestricted fluid path to be established between the master cylinder 12 and the wheel brake unit 10. Upon elapse of the predetermined period of time, the solenoid operated valve 52 takes the second position 62. In this case, the motor 26 is at rest when the brake pedal 14 is released and put into operation when the vehicle operator stamps the brake pedal 14.

A typical brake control established by the system of FIG. 5 is explained.

With the brake pedal 14 released, the solenoid operated valve 52 takes the first position 60 to provide unrestricted fluid path through the relief line 35 and the motor 26 keeps on driving the pump 28. All of the hydraulic fluid discharged by the pump 28 returns through the relief line 35 to the pump intake. Thus, no hydraulic fluid pressure develops in the wheel brake unit 10, When the vehicle operator stamps the brake pedal 14, the control unit 20 determines a desired motor speed N as a function of the sensed brake pedal stamping force F and wheel brake pressure $P_1$, and determines that the second position 62 be established in the relief line 35. The control unit 20 outputs a motor control signal and a solenoid current control signal. In response to the motor control signal, the amount of current supplied to the motor 26 is regulated to cause the pump 28 to rotate at the determined motor speed N. In response to the solenoid current control signal, the solenoid 56 is energized to shift the valve 52 against the return spring 58 to the second position 62 thereof. Owing to the provision of the flow restriction 64 in the return line 35, return flow of hydraulic fluid through the return line 35 is restricted so that hydraulic pressure develops in the wheel brake unit 10.

When the vehicle operator holds the brake pedal 14 with the same stamping force F, the motor 26 keeps on rotating at an unaltered speed, so that the wheel brake pressure $P_1$ is kept unaltered.

Subsequently, when the vehicle operator releases the brake pedal 14 rapidly, the control unit 20 stops supply of current to the solenoid 56, causing the solenoid operated valve 52 to take the first position 60 thereof. This allows unrestricted flow of hydraulic fluid through the relief line 35, causing a quick drop of wheel brake pressure $P_1$.

Figure 6:
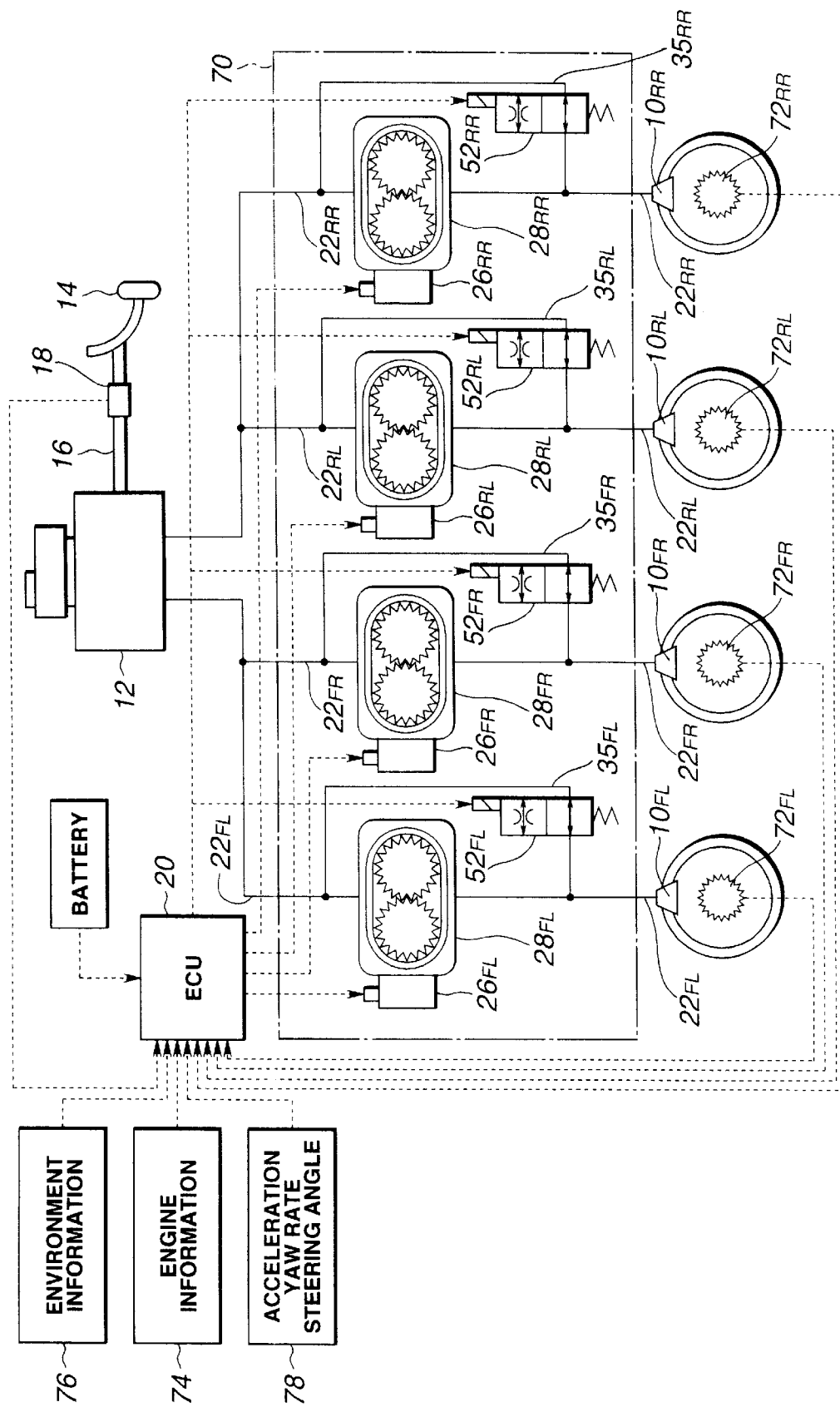
FIG. 6 is a diagram of a third embodiment of a wheel braking system in which the second embodiment is applied to each of four wheels of an automotive vehicle.

FIG. 6 shows, as the third embodiment, a wheel braking system in which the second embodiment of a wheel braking system that has been explained in connection with FIG. 5 is applied to each of four wheels.

In FIG. 6, a pressure generator 70 includes four pumps $28_{FL}$, $28_{FR}$, $28_{RL}$ and $28_{RR}$ that are driven by motors $26_{FL}$, $26_{FR}$, $26_{RL}$, and $26_{RR}$, respectively, and four solenoid operated two-position valves $52_{FL}$, $52_{FR}$, $52_{RL}$, and $52_{RR}$ that are disposed in relief lines $35_{FL}$, $35_{FR}$, $35_{RL}$ and $35_{RR}$, respectively. A master cylinder 12 is connected to a wheel brake unit $10_{FL}$ for a front left wheel via brake lines $22_{FL}$ and the pump $28_{FL}$. The relief line $35_{FL}$ connects the pump discharge of the pump $28_{FL}$ to the pump intake thereof. The master cylinder 12 is connected to a wheel brake unit $10_{FR}$ for a front right wheel via brake lines $22_{FR}$ and the pump $28_{FR}$. The relief line $35_{FR}$ connects the pump discharge of the pump $28_{FR}$ to the pump intake thereof. The master cylinder 12 is connected to a wheel brake unit $10_{RL}$ for a rear left wheel via brake lines $22_{RL}$ and the pump $28_{RL}$, The relief line $35_{RL}$ connects the pump discharge of the pump $28_{RL}$ to the pump intake thereof. The master cylinder 12 is connected to a wheel brake unit $10_{RR}$ for a rear right wheel via brake lines $22_{RR}$ and the pump $28_{RR}$. The relief line $35_{RR}$ connects the pump discharge of the pump $28_{RR}$ to the pump intake thereof.

A brake sensor 18 is provided to generate a brake pedal stamping force indicative signal. Wheel speed sensors $72_{FL}$, $72_{FR}$, $72_{RL}$ and $72_{RR}$ are provided for a front left wheel, a front right wheel, a rear left wheel and a rear right wheel, respectively. Each of the speed sensors measures wheel speed of the associated wheel and provides a wheel speed signal indicative of the measured wheel speed.

The output signal of the brake sensor 18 and the output signals of the wheel speed sensors $72_{FL}$, $72_{FR}$, $72_{RL}$ and $72_{RR}$ are fed to an electronic control unit 20. Also fed to the control unit 20 are output signals of engine information sensors as represented by a block 74. From these output signals, the control unit 21 recognizes the current state in which an engine operates. The control unit 20 receives environment information from a source of such information as represented by a block 76. The control unit 20 is connected to various sensors as represented by a block 78 to receive information as to acceleration, yaw rate, and steering angle. The control unit 20 may process the information to operate the hydraulic system as an antilock braking system (ATS) or a traction control system (TCS) or a vehicle dynamics control (VDC) system.

Figure 7:
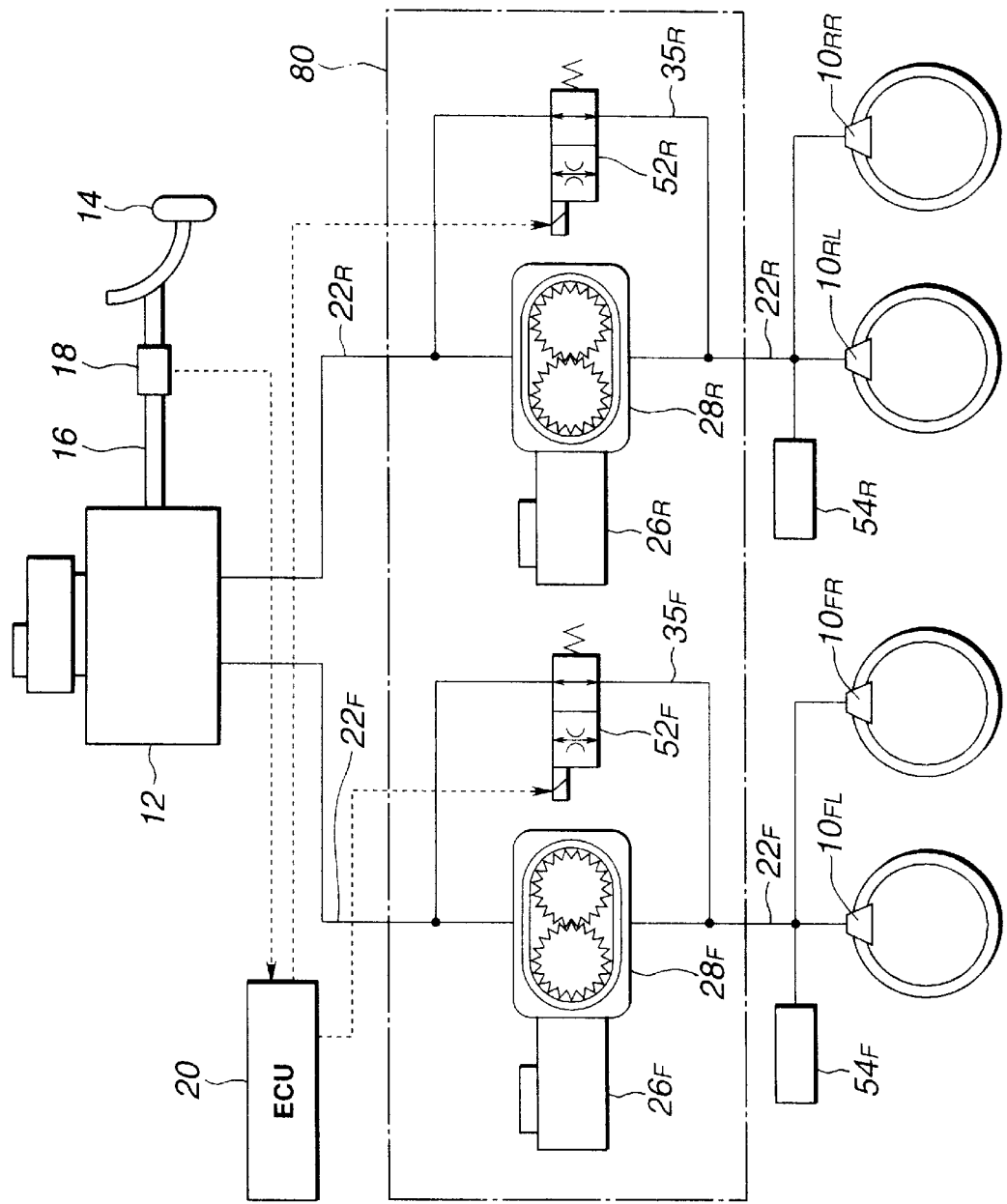
FIG. 7 is a diagram of a fourth embodiment of a wheel braking system in which the second embodiment is applied to each of two pairs of wheels of an automotive vehicle.

FIG. 7 shows, as the fourth embodiment, a wheel braking system in which the second embodiment of a wheel braking system that has been explained in connection with FIG. 5 is applied to a pair of front wheels and a pair of rear wheels.

In FIG. 7, a pressure generator 80 includes two pumps $28_F$ and $28_R$ that are driven by motors $26_F$ and $26_R$, respectively, and two solenoid operated two-position valves $52_F$ and $52_R$ that are disposed in relief lines $35_F$ and $35_R$, respectively. A master cylinder 12 is connected to a wheel brake unit $10_{FL}$ for a front left wheel and a wheel brake unit $10_{FR}$ for a front right wheel via brake lines $22_F$ and the pump $28_F$. The relief line $35_F$ connects the pump discharge of the pump $28_F$ to the pump intake thereof. The master cylinder 12 is connected to a wheel brake unit $10_{RL}$ for a rear left wheel and a wheel brake unit $10_{RR}$ for a rear right wheel via lines $22_R$ and the pump $28_L$. The relief line $35_R$ connects the pump discharge of the pump $28_L$ to the pump intake thereof.

Figure 8:
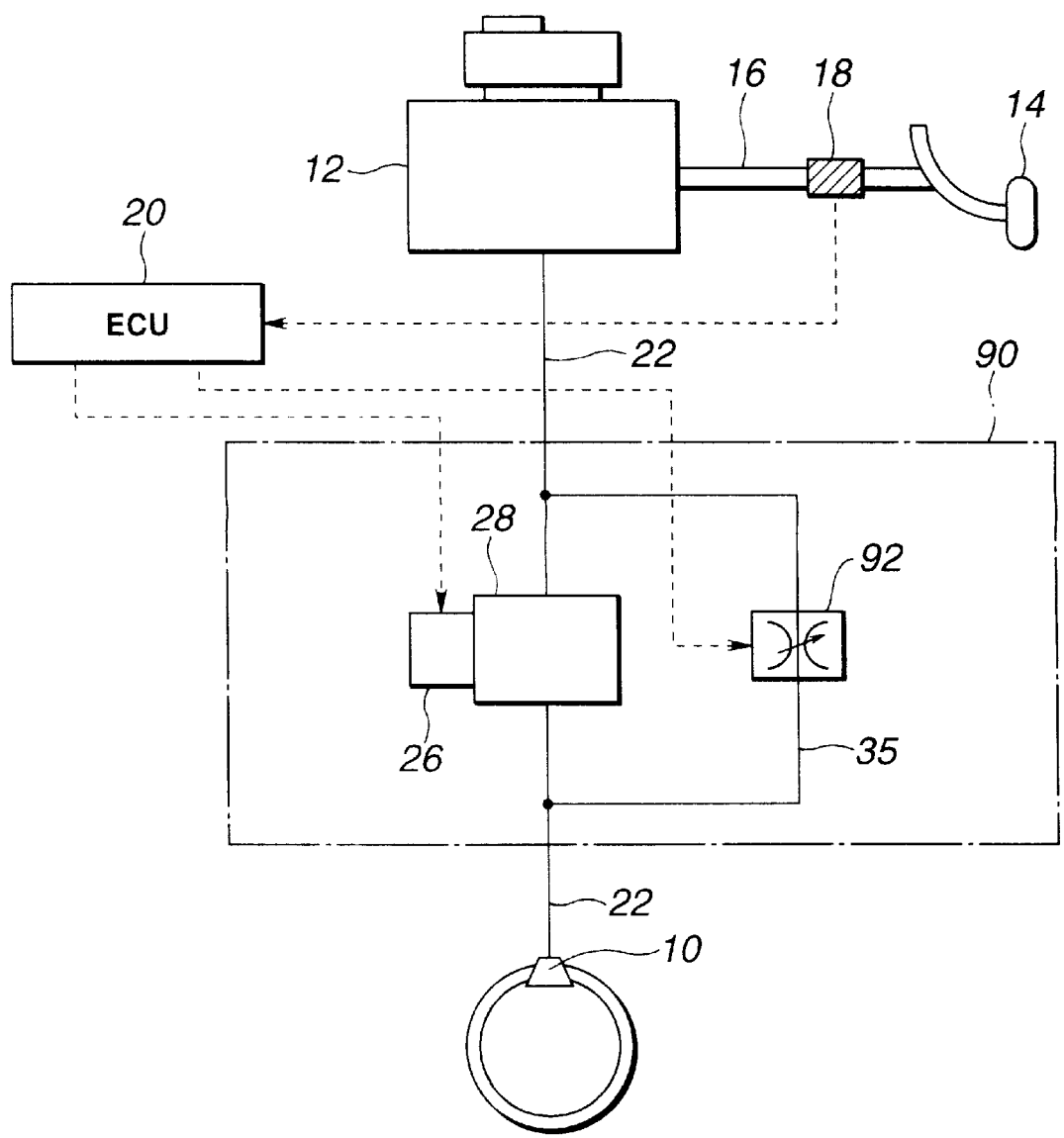
FIG. 8 is a diagram of a fifth embodiment of a wheel braking system including a variable flow restriction in a bypass fluid path connected across a motor driven pump.

FIG. 8 shows, as the fifth embodiment, a wheel braking system in which the first embodiment of a wheel braking system that has been explained primarily in connection with FIG. 1 is slightly modified. The fifth embodiment is substantially the same as the first embodiment except the provision of a solenoid operated variable flow restriction 92 in a relief line 35 for a pump 28 of a pressure generator 90 instead of the fixed flow restriction 36 of the pressure generator 24.

According to this embodiment, a control unit 20 alters the flow cross-sectional area by varying solenoid current passing through a solenoid, not shown, of the variable flow restriction 92.

A typical brake control established by the system of FIG. 8 is explained.

When a brake pedal 14 is left released during travel of the vehicle, the control unit 20 operates a motor 26 at a constant speed and maximizes the flow cross sectional area of the variable flow restriction 92. Under this condition, hydraulic fluid discharged by the pump 28 keeps on returning to the pump intake through the relief line 35 without any flow restriction. Thus, no wheel brake pressure develops at a wheel brake unit 10.

When the vehicle operator stamps the brake pedal 14, the control unit 20 determines brake pedal stamping force F from the output of a brake sensor 18. When the brake pedal stamping force F is sensed, the control unit 20 determines a desired flow cross sectional area predetermined for the sensed brake pedal stamping force F and determines solenoid current needed to cause the variable flow restriction 92 to hold the determined desired flow cross sectional area. The greater the brake pedal stamping force is, the smaller the desired flow cross sectional area is. Thus, wheel brake pressure $P_1$ corresponding to the brake pedal stamping force F develops at the wheel brake unit 10.

When the vehicle operator holds the brake pedal 14 with the same brake pedal stamping force F, the variable flow restriction 92 keeps on providing flow cross sectional area that is established upon initiation of this holding operation by the vehicle operator. Thus, wheel brake pressure $P_1$ that is established upon the initiation of the brake pedal holding operation is maintained.

When subsequently the vehicle operator weakens the brake pedal stamping force, the control unit 20 increases the flow cross sectional area of the variable flow restriction 92 in response to a drop of the brake pedal stamping force thereby to cause the wheel brake pressure $P_1$ to drop.

The control unit 20 calculates brake pedal release rate or speed V at which the brake pedal stamping force F drops and compares the release rate V with a predetermined reference Va. When the release rate V becomes greater than the reference Va upon rapid release of the brake pedal 14, the control unit 20 maximizes the flow cross sectional area of the variable flow restriction 92 thereby to accomplish a quick drop of wheel brake pressure $P_1$.

According to the control strategy just described, the control unit 20 operates the motor 26 at a constant speed over the whole ranges of travel of the vehicle and alters the flow cross sectional area by regulating solenoid current to the variable flow restriction 92. The opening degree of the variable flow restriction 92 is increased upon stamping the brake pedal 14, while it is decreased upon releasing the brake pedal 14.

If need arises, the motor speed may be altered in combination with the control of flow cross sectional area of the relief line 35 to increase or decrease wheel brake pressure $P_1$.

Figure 9:
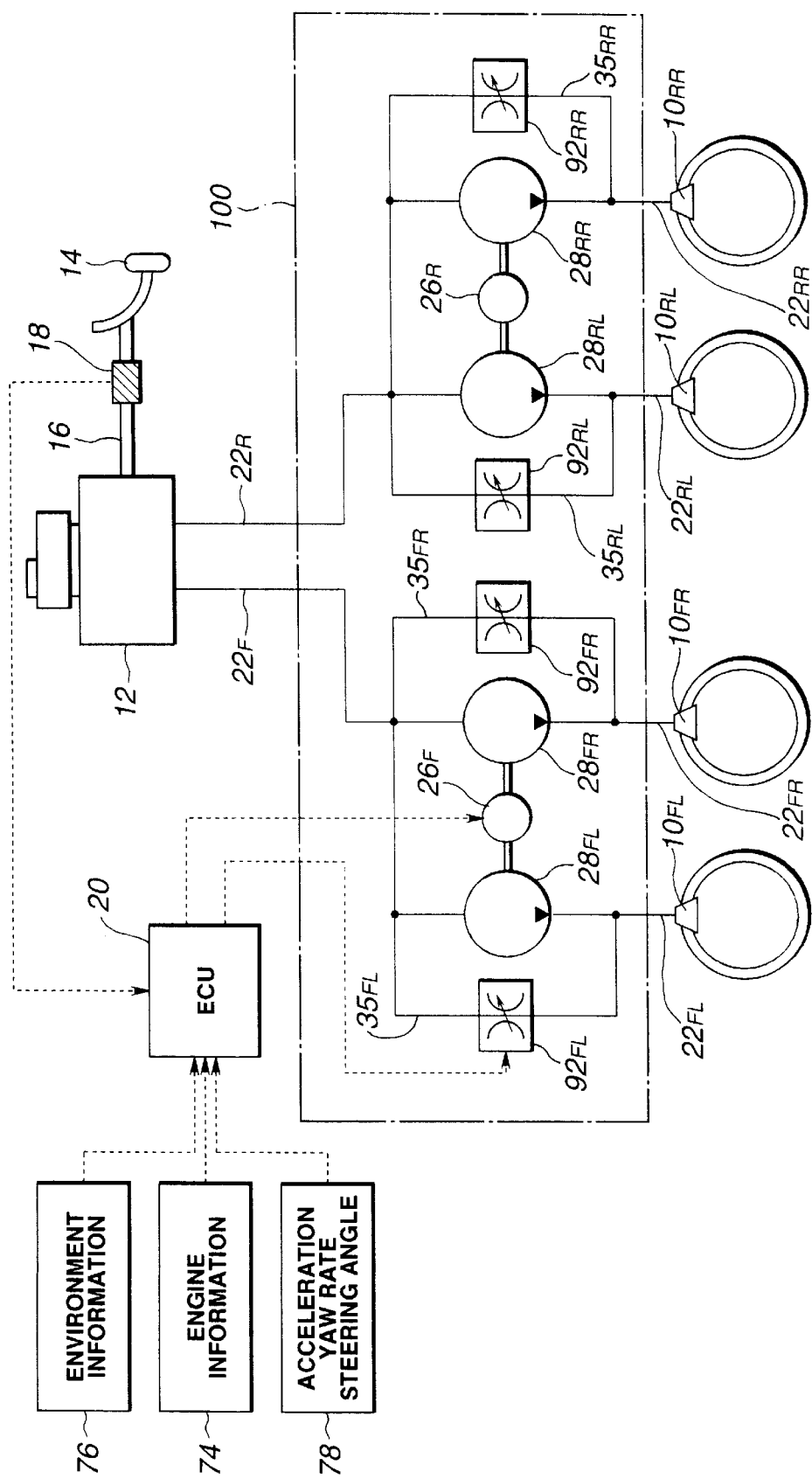
FIG. 9 is a diagram of a sixth embodiment of a wheel braking system in which the fifth embodiment is applied to each of wheels of an automotive vehicle.

FIG. 9 shows, as the sixth embodiment, a wheel braking system in which the fifth embodiment of a wheel braking system that has been explained in connection with FIG. 8 is applied to each of four wheels.

In FIG. 9, a pressure generator 100 includes four pumps $28_{FL}$, $28_{FR}$, $28_{RL}$ and $28_{RR}$, and two motors $26_F$ and $26_R$. The motor $26_F$ drives the pumps $28_{FL}$ and $28_{FR}$, while the other pump $26_R$ drives the other two pumps $28_{RL}$ and $28_{RR}$. The pressure generator 100 also includes four solenoid operated variable flow restrictions $92_{FL}$, $92_{FR}$, $92_{RL}$ and $92_{RR}$ that are disposed in relief lines $35_{FL}$, $35_{FR}$, $35_{RL}$ and $35_{RR}$, respectively. A master cylinder 12 is connected to a wheel brake unit $10_{FL}$ for a front left wheel via brake lines $22_F$, $22_{FL}$ and the pump $28_{FL}$. The relief line $35_{FL}$ connects the pump discharge of the pump $28_{FL}$ to the pump intake thereo.f The master cylinder 12 is connected to a wheel brake unit $10_{FR}$ for a front right wheel via brake lines $22_F$, $22_{FR}$ and the pump $28_{FR}$. The relief line $35_{FR}$ connects the pump discharge of the pump $28_{FR}$ to the pump intake thereof. The master cylinder 12 is connected to a wheel brake unit $10_{RL}$ for a rear left wheel via brake lines $22_R$, $22_{RL}$ and the pump $28_{RL}$. The relief line $35_{RL}$ connects the pump discharge of the pump $28_{RL}$ to the pump intake thereof. The master cylinder 12 is connected to a wheel brake unit $10_{RR}$ for a rear right wheel via brake lines $22_R$, $22_{RR}$ and the pump $28_{RR}$. The relief line $35_{RR}$ connects the pump discharge of the pump $28_{RR}$ to the pump intake thereof.

A brake sensor 18 is provided to generate a brake pedal stamping force indicative signal. Although not shown, wheel speed sensors, like wheel speed sensors $72_{FL}$, $72_{FR}$, $72_{RL}$ and $72_{RR}$ in FIG. 6, are provided for front left wheel, front right wheel, rear left wheel and rear right wheel, respectively. Each of the speed sensors measures wheel speed of the associated wheel and provides a wheel speed signal indicative of the measured wheel speed.

The output signal of the brake sensor 18 and the output signals of the wheel speed sensors are fed to an electronic control unit 20. Also fed to the control unit 20 are output signals of engine information sensors as represented by a block 74. From these output signals, the control unit 21 recognizes the current state in which an engine operates. The control unit 20 receives environment information from a source of such information as represented by a block 76. The control unit 20 is connected to various sensors as represented by a block 78 to receive information as to acceleration, yaw rate, and steering angle. The control unit 20 may process the information to operate the hydraulic system as an antilock braking system (ATS) or a traction control system (TCS) or a vehicle dynamics control (VDC) system.

Figure 10:
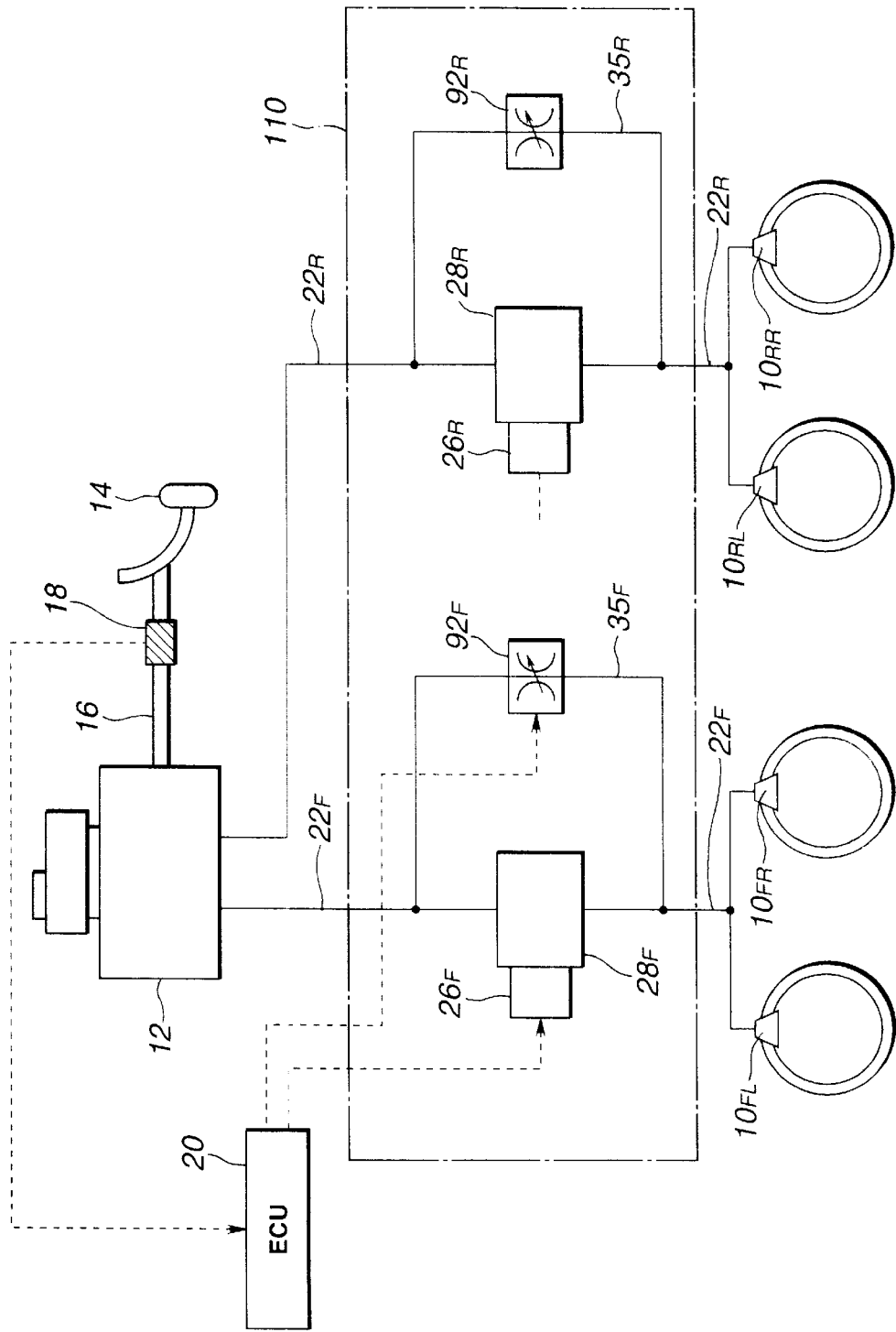
FIG. 10 is a diagram of a seventh embodiment of a wheel braking system in which the fifth embodiment is applied to each of two pairs of wheels of an automotive vehicle.

FIG. 10 shows, as the seventh embodiment, a wheel braking system in which the fifth embodiment of a wheel braking system that has been explained in connection with FIG. 8 is applied to a pair of front wheels and a pair of rear wheels.

In FIG. 10, a pressure generator 110 includes two pumps $28_F$ and $28_R$ that are driven by motors $26_F$ and $26_R$, respectively, and two solenoid operated variable flow restrictions $92_F$ and $92_R$ that are disposed in relief lines $35_F$ and $35_R$, respectively. A master cylinder 12 is connected to a wheel brake unit $10_{FL}$ for front left wheel and a wheel brake unit $10_{FR}$ for front right wheel via brake lines $22_F$ and the pump $28_F$. The relief line $35_F$ connects the pump discharge of the pump $28_F$ to the pump intake thereof. The master cylinder 12 is connected to a wheel brake unit $10_{RL}$ for rear left wheel and a wheel brake unit $10_{RR}$ for rear right wheel via lines $22_R$ and the pump $28_L$. The relief line $35_R$ connects the pump discharge of the pump $28_L$ to the pump intake thereof.

Figure 11:
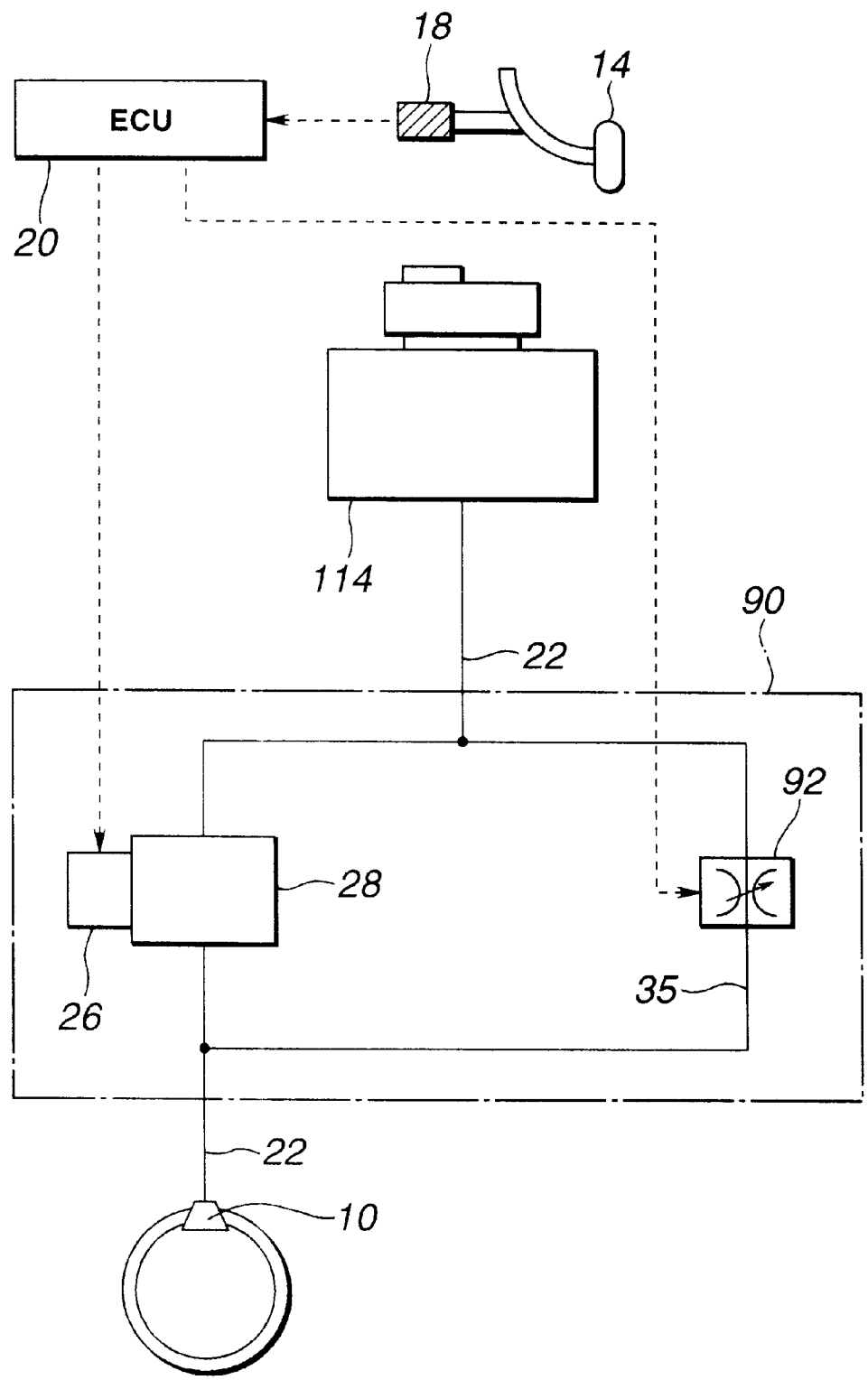
FIG. 11 is a diagram of an eighth embodiment of a wheel braking system including a reservoir instead of a master cylinder.

FIG. 11 shows, as the eighth embodiment, a wheel braking system that is substantially the same as the fifth embodiment shown in FIG. 8 except the provision of a tank 114 instead of the master cylinder 12.

A typical brake control established by the system of FIG. 11 is the same as that established by the system of FIG. 8.

Figure 12:
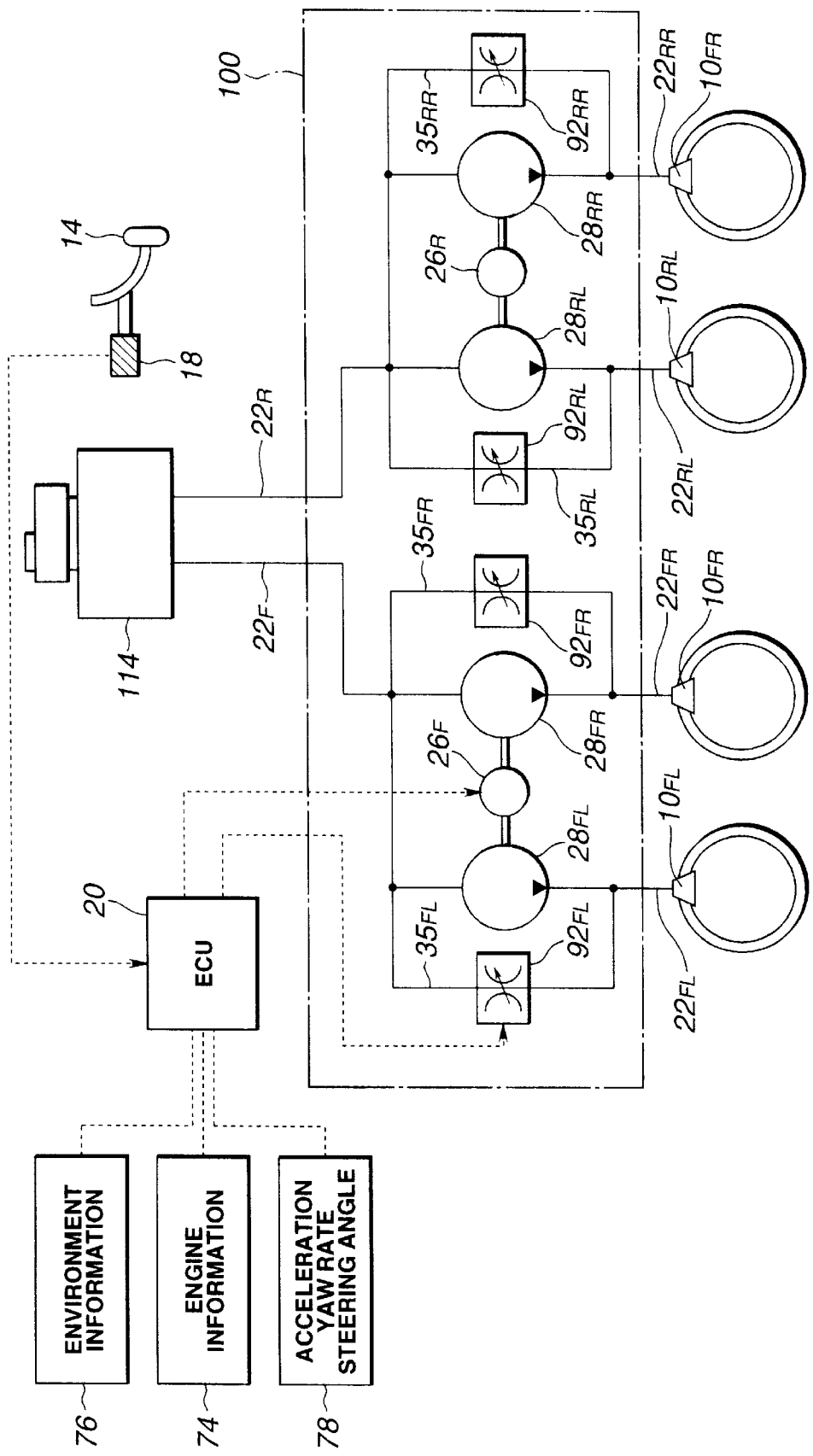
FIG. 12 is a diagram of a ninth embodiment of a wheel braking system in which the eighth embodiment is applied to each of wheels of an automotive vehicle.

FIG. 12 shows, as the ninth embodiment, a wheel braking system that is substantially the same as the sixth embodiment shown in FIG. 9 except the provision of a tank 114 instead of the master cylinder 12.

Figure 13:
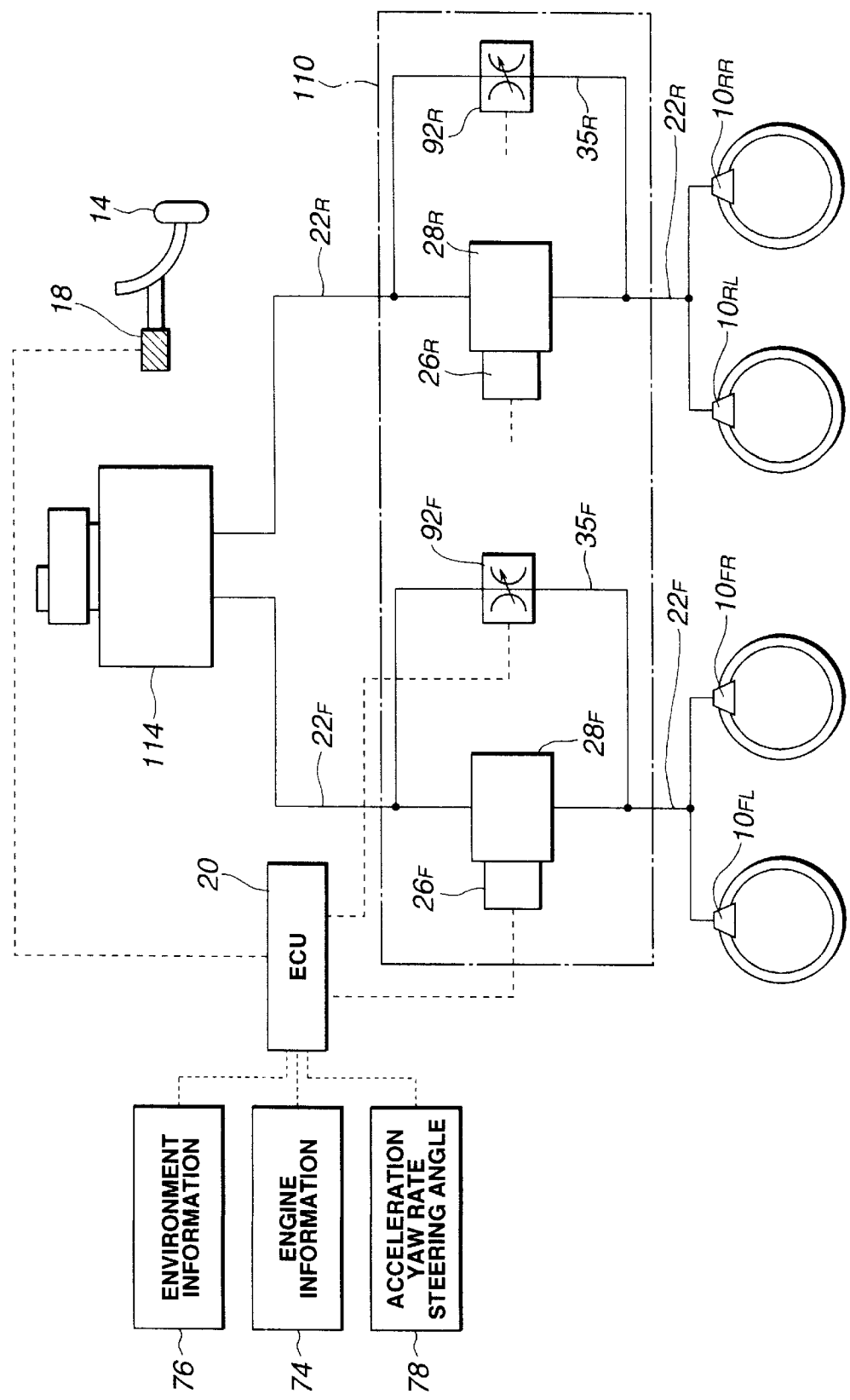
FIG. 13 is a diagram of a tenth embodiment of a wheel braking system in which the eighth embodiment is applied to each of two pairs of wheels of an automotive vehicle.

FIG. 13 shows, as the tenth embodiment, a wheel braking system that is substantially the same as the seventh embodiment shown in FIG. 10 except the provision of a tank 114 instead of the master cylinder 12.

Figure 14:
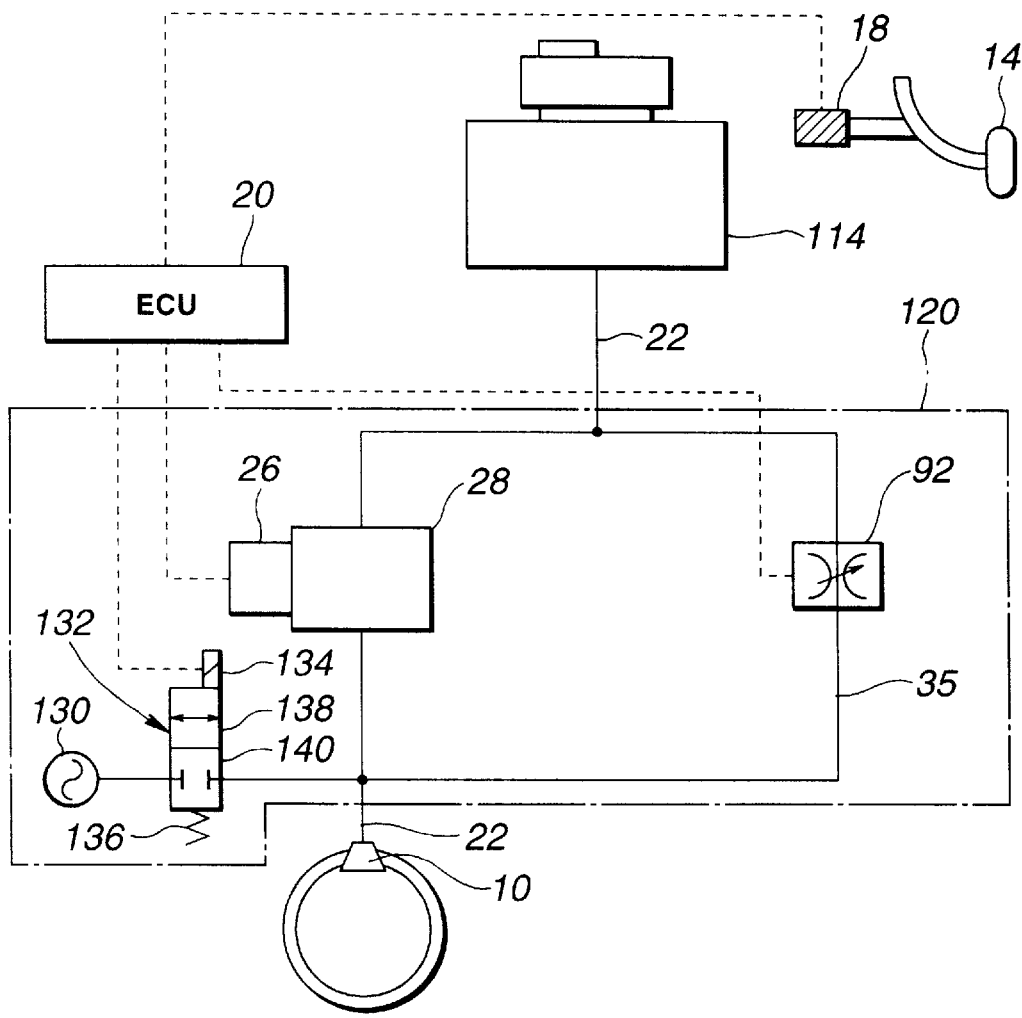
FIG. 14 is a diagram of an eleventh embodiment of a wheel braking system including an accumulator and a solenoid operated valve.

FIG. 14 shows, as the eleventh embodiment, a wheel braking system that is substantially the same as the eighth embodiment shown in FIG. 11 except the provision of a pressure generator 120 instead of the pressure generator 90. The pressure generator 120 is different from the pressure generator 90 in that an accumulator 130 is connected to a wheel brake unit 10 via an accumulator control valve 132. The accumulator control valve 132 takes the form of a solenoid operated two-position valve that includes a solenoid 134 and a return spring 136. When the solenoid 134 is not energized, the valve 132 takes a first or closed position 138 owing to the action of the return spring 136. In the first position 138, a fluid communication between the accumulator 130 and the wheel brake unit 10 is blocked or closed. When the solenoid 134 is energized, the valve 132 takes a second or closed position 140. In the second position 140, the fluid communication is established or opened. A control unit 20 is connected to the solenoid 134.

For quick rise of wheel brake pressure within the brake unit 10, the control unit 20 outputs a solenoid control signal in the initial stage of increase of wheel brake pressure. In response to the solenoid control signal, the solenoid 134 is energized for a predetermined period of time, thereby to cause the accumulator 130 to provide hydraulic fluid to the wheel brake unit 10. The predetermined period of time is short enough to minimize influence of the accumulator 130 on the subsequent pressure increase that is expected by restriction of flow through a relief line 35 by a variable flow restriction 92.

An accumulator charge operation established by the system of FIG. 14 is explained. The control unit 20 determines whether or not the vehicle travels in response to an output signal of a vehicle speed sensor, not shown. When the vehicle is at standstill, the control unit 20 maximizes flow restriction through the relief line 35, energizes the solenoid 134 of the accumulator control valve 132, and operates the pump 28, thus allowing supply of hydraulic fluid to the accumulator 130. The accumulator charge operation of this kind may be carried out each time when the vehicle has come to a stop. If a pressure sensor is provided to measure pressure within the accumulator 130, the charge operation may be carried out only when the pressure within the accumulator 130 is lower than a predetermined low level after the vehicle has come to a stop. The charge operation is terminated when the pressure within the accumulator increases to a predetermined high level.

If need arises, a quick drop of wheel brake pressure within the brake unit 10 may be conducted. This need arises when wheel brake pressure is to be rapidly decreased during antilock brake control. In this case, the pressure within the accumulator 130 is normally kept at the atmospheric level. Upon determination that the wheel brake pressure be decreased during antilock brake control, the control unit 20 energizes the solenoid 134 for a predetermined period of time to allow discharge of hydraulic fluid from the brake unit 10 toward the accumulator 130.

If a pressure sensor is provided to measure pressure within the accumulator 130, the accumulator 130 may be used in both the above-mentioned quick rise and quick drop operation modes. When the measured pressure is low enough to allow operation of the accumulator 130 in quick drop mode, the control unit 20 uses the accumulator 130 for quick drop of wheel brake pressure during antilock brake control. When the measured pressure is high enough to allow operation of the accumulator 130 in quick rise mode, the control unit 20 uses the accumulator 130 for quick rise of wheel brake pressure.

Figure 15:
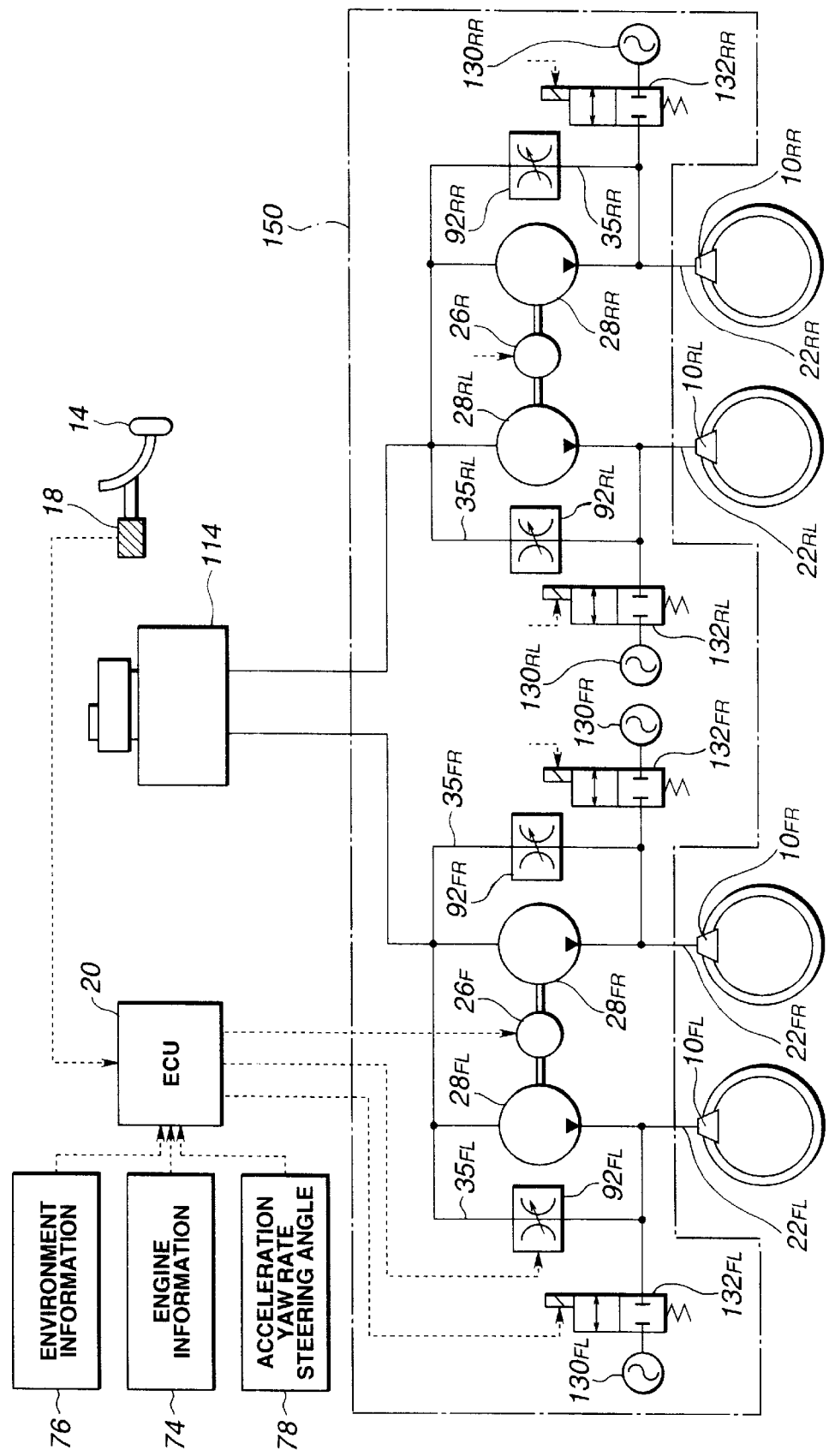
FIG. 15 is a diagram of a twelfth embodiment in which the eleventh embodiment is applied to each of wheels of an automotive vehicle.

FIG. 15 shows, as the twelfth embodiment, a wheel braking system in which the eleventh embodiment of a wheel braking system that has been explained in connection with FIG. 14 is applied to each of four wheels. In other words, this embodiment is substantially the same as the sixth embodiment shown in FIG. 9 except the provision of a tank 114 instead of the master cylinder 12. Another difference resides in the provision of four accumulators $130_{FL}$, $130_{FR}$, $130_{RL}$ and $130_{RR}$ that are connected to four wheel brake units $10_{FL}$, $10_{FR}$, $10_{RL}$, and $10_{RR}$, respectively, via the corresponding accumulator control valves $132_{FL}$, $132_{FR}$, $132_{RL}$, and $132_{RR}$.

From comparison of FIG. 15 with FIG. 9, it is seen that a pressure generator 150 shown in FIG. 15 is different from the pressure generator 100 only in the provision of accumulators $130_{FL}$, $130_{FR}$, $130_{RL}$, and $130_{RR}$, and accumulator control valves $132_{FL}$, $132_{FR}$, $132_{RL}$, and $132_{RR}$.

Figure 16:
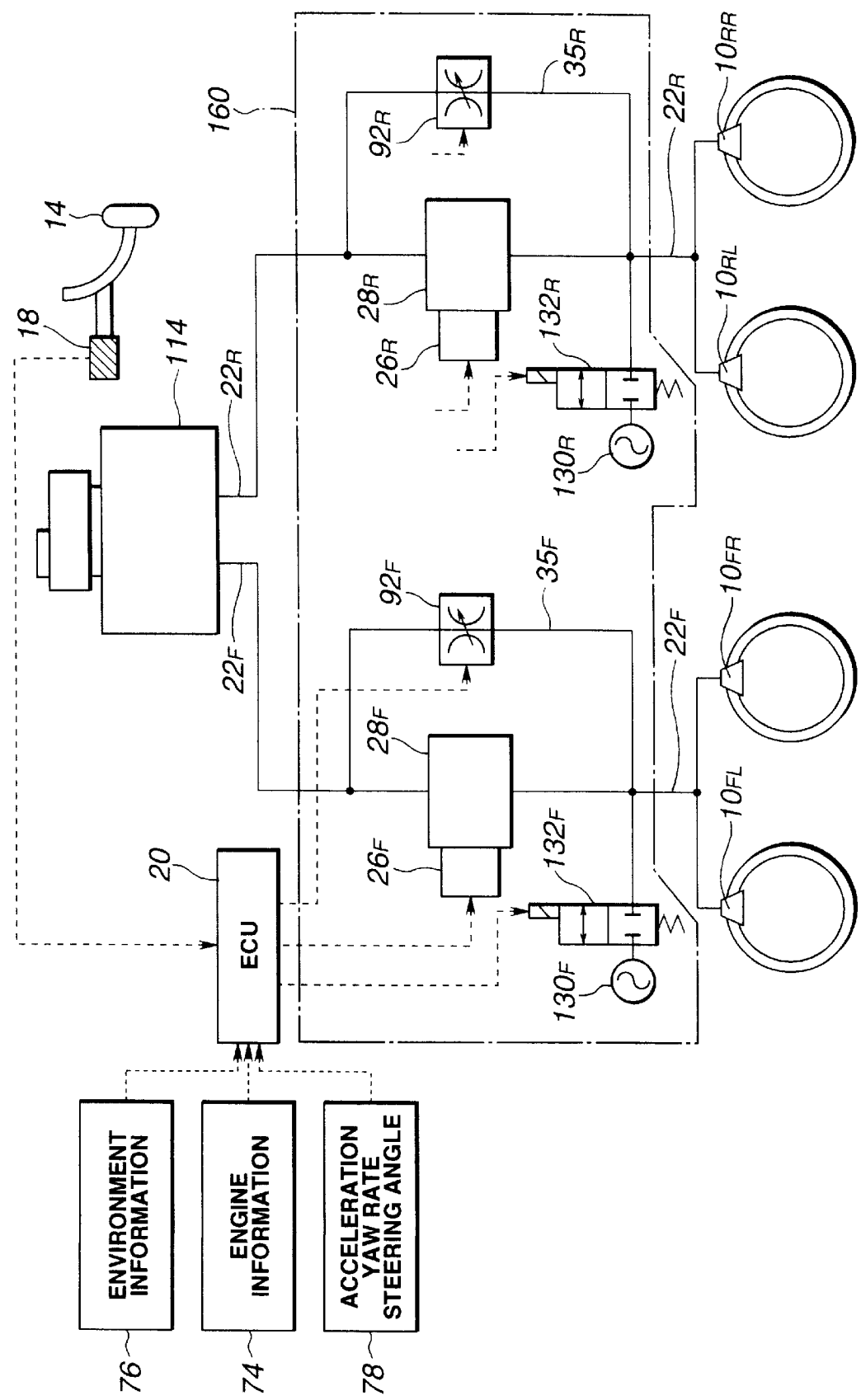
FIG. 16 is a diagram of a thirteenth embodiment in which the eleventh embodiment is applied to each of wheels of an automotive vehicle.

FIG. 16 shows, as the thirteenth embodiment of a wheel braking system in which the eleventh embodiment of a braking system that has been explained in connection with FIG. 14 is applied to a pair of front wheels and a pair of rear wheels. In other words, this embodiment is substantially the same as the seventh embodiment shown in FIG. 10 except the provision of a tank 114 instead of the master cylinder 12. Another difference resides in the provision of two accumulators $130_F$, and $130_R$, $130_{RL}$ that are connected to a pair of front wheel brake units $10_{FL}$ and $10_{FR}$, and a pair of rear wheel brake units $10_{RL}$ and $10_{RR}$, respectively, via the corresponding accumulator control valve $132_F$ and $132_R$.

From comparison of FIG. 16 with FIG. 10, it is seen that a pressure generator 160 (see FIG. 16) is different from the pressure generator 110 (see FIG. 10) only in the provision of accumulators $130_F$ and $130_R$, and accumulator control valves $132_F$ and $132_R$.

Figure 17:
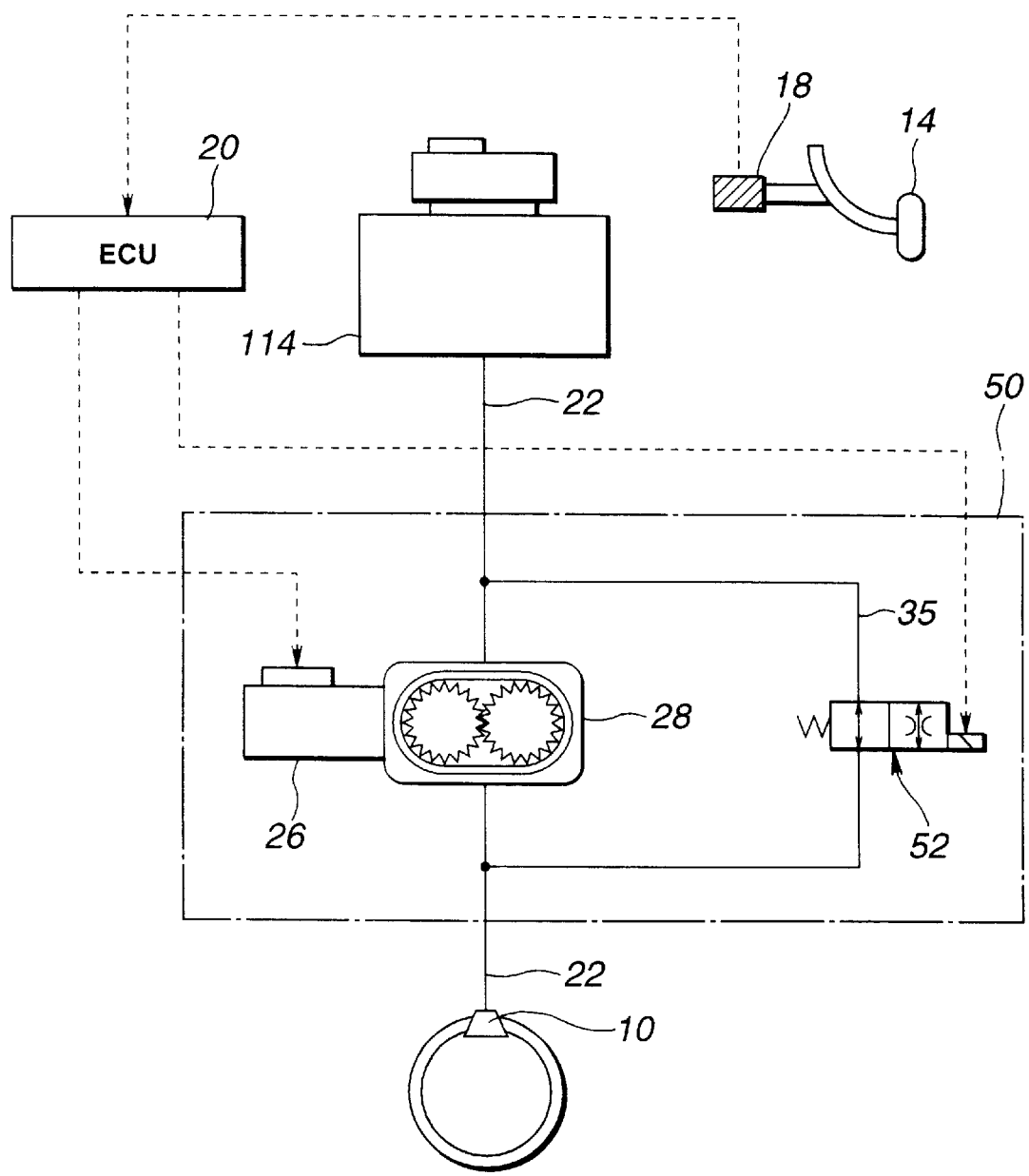
FIG. 17 is a diagram of a fourteenth embodiment including a solenoid operated valve that can establish an unrestricted bypass fluid path.

FIG. 17 shows, as the fourteenth embodiment, a wheel braking system that is substantially the same as the second embodiment shown in FIG. 5 except the provision of a tank 114 instead of the master cylinder 12.

Figure 18:
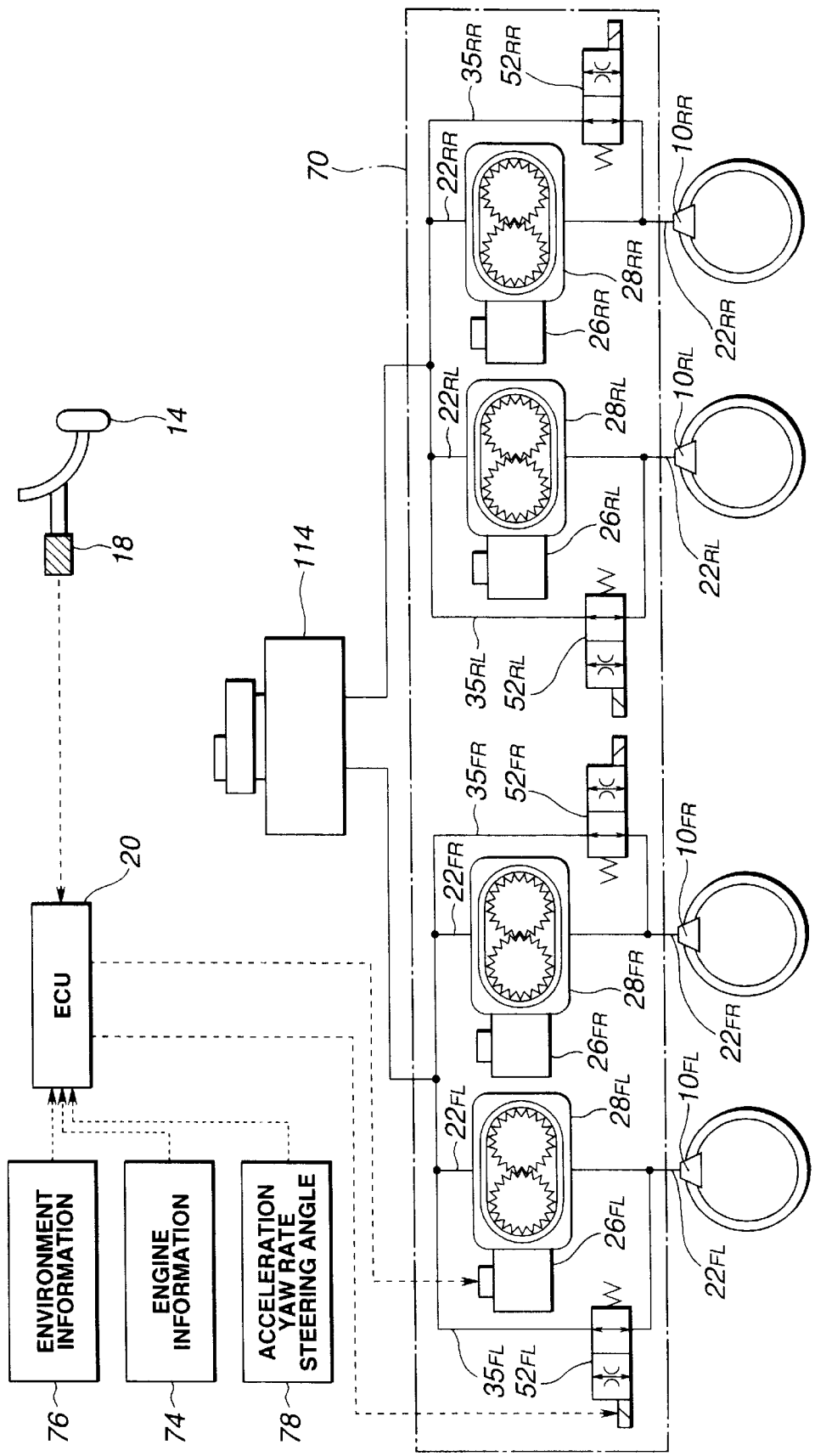
FIG. 18 is a diagram of a fifteenth embodiment in which the fourteenth embodiment is applied to each of wheels of an automotive vehicle.

FIG. 18 shows, as the fifteenth embodiment, a wheel braking system that is substantially the same as the third embodiment shown in FIG. 6 except the provision of a tank 114 instead of the master cylinder 12.

Figure 19:
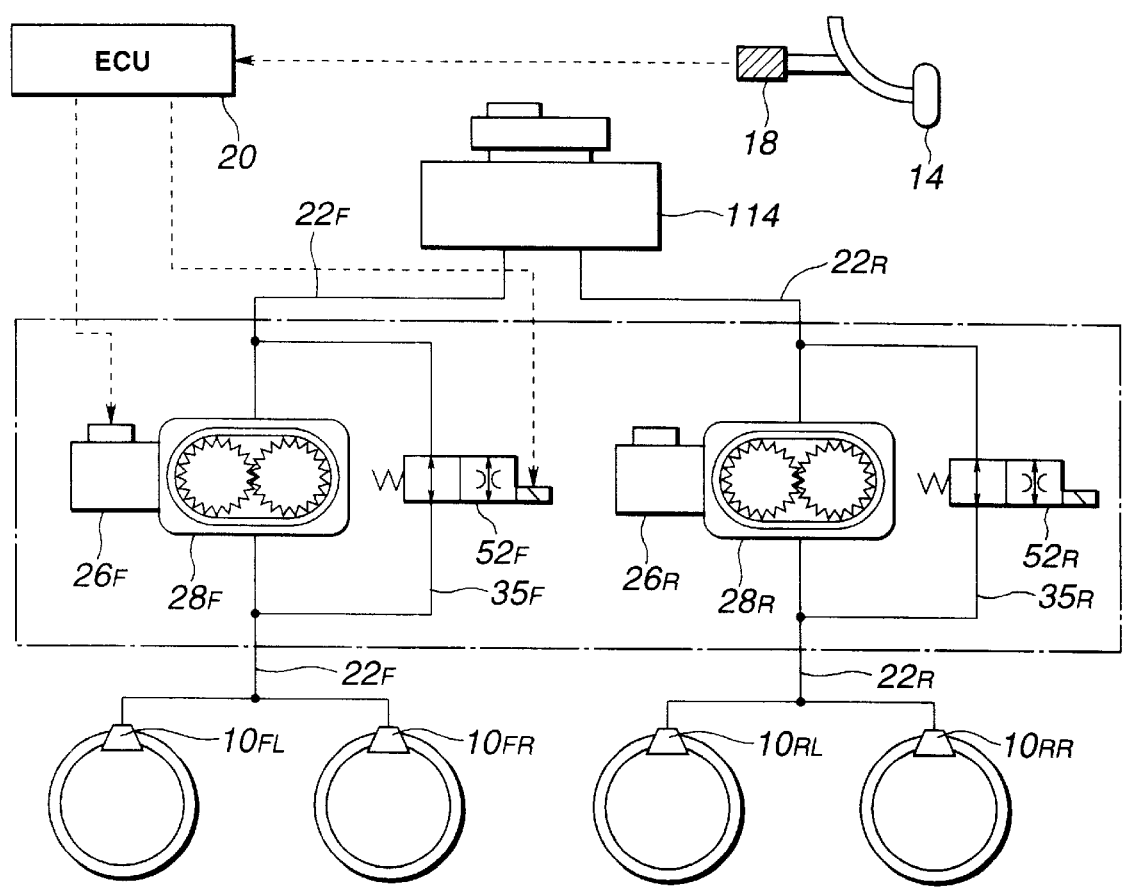
FIG. 19 is a diagram of a sixteenth embodiment in which the fourteenth embodiment is applied to each of two pairs of wheels of an automotive vehicle.

FIG. 19 shows, as the sixteenth embodiment, a wheel braking system that is substantially the same as the fourth embodiment shown in FIG. 7 except the provision of a tank 114 instead of the master cylinder 12.

From the previous description of the various embodiments, it is readily understood that the master cylinder 12 or the tank 114 may be used as a source of hydraulic fluid of the wheel braking system according to the present invention.

What is claimed is:

1. A wheel braking system for a vehicle, comprising:

a master cylinder;

a brake pedal operable by a vehicle operator, said brake pedal being operatively connected to said master cylinder;

a wheel brake unit;

a motor driven gear pump having a pump intake connected to said master cylinder and a pump discharge connected to said wheel brake unit;

a relief line that bypasses said pump;

a variable flow restriction that restricts flow of hydraulic fluid through said relief line, said variable flow restriction being variable in cross sectional area in response to a flow restriction control signal;

a brake sensor that detects a brake pedal force applied by the vehicle operator and generates a brake force signal indicative thereof; and a control unit that determines, in response to said brake force signal, a desired flow cross sectional area of said variable flow restriction, and generates said flow restriction control signal needed to control said variable flow restriction to maintain said desired flow cross sectional area.

2. A wheel braking system as claimed in claim 1, wherein said control unit control said pump.

3. A wheel braking system as claimed in claim 2, wherein said control unit maintains said pump at a constant speed.

4. A wheel braking system as claimed in claim 1, wherein said control unit controls said variable flow restriction so that the cross sectional area thereof is at a maximum when said brake pedal is released, the cross sectional area thereof is decreased as the brake pedal force is increased, and the cross sectional area thereof is increased as the brake pedal force is decreased.

5. A wheel braking system as claimed in claim 4, wherein said control unit is operable to vary the speed of said motor driven gear pump.

6. A wheel braking system as claimed in claim 5, wherein said control unit maintains said motor driven gear pump at a constant speed.

7. A wheel braking system as claimed in claim 1, wherein said control unit is operable to vary the speed of said motor driven gear pump.

8. A wheel braking system as claimed in claim 1, wherein said control unit maintains said motor driven gear pump at a constant speed.

9. A wheel braking system for a vehicle comprising:

a master cylinder;

a brake pedal operable by a vehicle operator, said brake pedal being operatively connected to said master cylinder;

a plurality of wheel brake units;

a plurality of motor driven gear pumps, each having a pump intake connected to said master cylinder and a pump discharge connected to one of said wheel brake units;

a plurality of relief lines that bypasses said pumps, respectively;

a plurality of variable flow restrictions that restrict flow of hydraulic fluid through said relief lines, each of said variable flow restrictions being variable in cross sectional area in response to a flow restriction control signal;

a brake sensor that detects a brake pedal force applied by the vehicle operator and generates a brake force signal indicative thereof; and a control unit that determines, in response to said brake force signal, a desired flow cross sectional area of the respective variable flow restriction, and generates said flow restriction control signal needed to control the respective variable flow restriction to maintain said desired flow cross sectional area.

10. A wheel braking system as claimed in claim 9, wherein said pump discharges of said motor driven gear pumps are connected to the respective wheel brake units.

11. A wheel braking system as claimed in claim 10, wherein one of said pumps is connected to two of said brake units.

* * * * *